(12) United States Patent
Shidore et al.

(10) Patent No.: US 11,220,172 B2
(45) Date of Patent: Jan. 11, 2022

(54) MOTOR VEHICLE HYBRID POWERTRAIN

(71) Applicant: GM GLOBAL TECHNOLOGY OPERATIONS LLC, Detroit, MI (US)

(72) Inventors: Neeraj S. Shidore, Novi, MI (US); Derek F. Lahr, Howell, MI (US); Lei Hao, Troy, MI (US); Madhusudan Raghavan, West Bloomfield, MI (US); Suresh Gopalakrishnan, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 119 days.

(21) Appl. No.: 16/597,007

(22) Filed: Oct. 9, 2019

(65) Prior Publication Data
US 2021/0107348 A1    Apr. 15, 2021

(51) Int. Cl.
*B60K 6/54*       (2007.10)
*B60K 6/383*      (2007.10)
*B60K 6/387*      (2007.10)
*F16H 1/28*       (2006.01)
*F16H 9/02*       (2006.01)
(Continued)

(52) U.S. Cl.
CPC .................. *B60K 6/54* (2013.01); *B60K 6/26* (2013.01); *B60K 6/383* (2013.01); *B60K 6/387* (2013.01); *F16H 1/28* (2013.01); *F16H 9/02* (2013.01); *H02K 7/006* (2013.01); *H02K 7/108* (2013.01); *H02K 7/116* (2013.01); *H02K 11/0094* (2013.01); *H02K 11/048* (2013.01); *H02K 13/003* (2013.01); *B60Y 2200/92* (2013.01); *B60Y 2400/70* (2013.01); *F16H 2200/0021* (2013.01)

(58) Field of Classification Search
CPC ... B60K 6/54; B60K 6/26; B60K 6/48; B60Y 2200/92
See application file for complete search history.

(56) References Cited

U.S. PATENT DOCUMENTS

| | | | |
|---|---|---|---|
| 8,152,682 B2* | 4/2012 | Swales ...................... | F16H 3/66 475/275 |
| 2010/0087290 A1* | 4/2010 | Schoenek ............. | B60W 10/06 477/5 |

(Continued)

*Primary Examiner* — Brian L Swenson
(74) *Attorney, Agent, or Firm* — Quinn IP Law

(57) ABSTRACT

A vehicle powertrain includes a first power-source configured to generate a first power-source torque and a multiple speed-ratio transmission configured to transmit the first power-source torque to power the vehicle. The powertrain also includes a fluid coupling having a fluid pump shaft operatively connected to the first power-source and a turbine shaft operatively connected to the multi-speed transmission. The fluid coupling is configured to multiply the first power-source torque, and transfer the multiplied first power-source torque to the multiple speed-ratio transmission. The powertrain additionally includes a second power-source configured to generate a second power-source torque and a first torque transfer system configured to connect the second power-source to the first power-source. The powertrain further includes a second torque transfer system configured to connect the second power-source to the multi-speed transmission. A motor vehicle having such a powertrain is also envisioned.

18 Claims, 4 Drawing Sheets

(51) Int. Cl.
*H02K 7/00* (2006.01)
*H02K 7/108* (2006.01)
*H02K 7/116* (2006.01)
*H02K 11/00* (2016.01)
*H02K 11/04* (2016.01)
*H02K 13/00* (2006.01)
*B60K 6/26* (2007.10)

(56) References Cited

U.S. PATENT DOCUMENTS

| | | | |
|---|---|---|---|
| 2011/0179890 A1* | 7/2011 | Swales | B60K 6/547 |
| | | | 74/6 |
| 2016/0052382 A1* | 2/2016 | Clark | B60K 6/543 |
| | | | 477/5 |
| 2016/0229393 A1* | 8/2016 | McCullough | B60K 6/547 |
| 2018/0015817 A1* | 1/2018 | Samie | F16H 57/0457 |
| 2019/0031180 A1* | 1/2019 | Lee | B60K 6/383 |

* cited by examiner

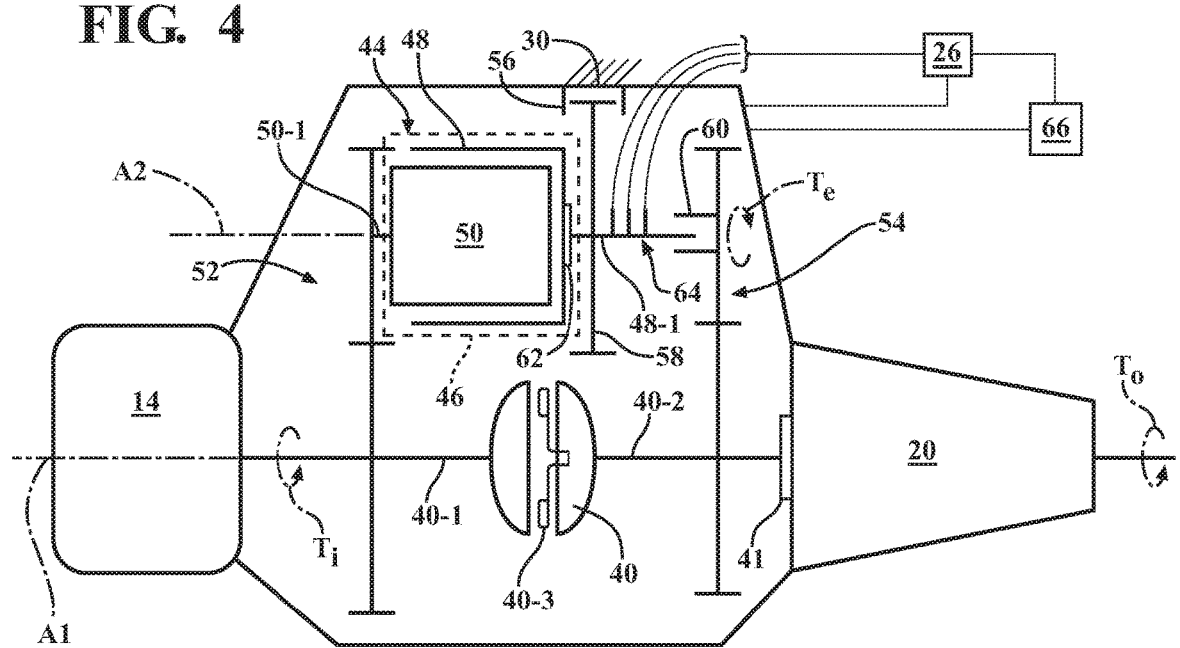
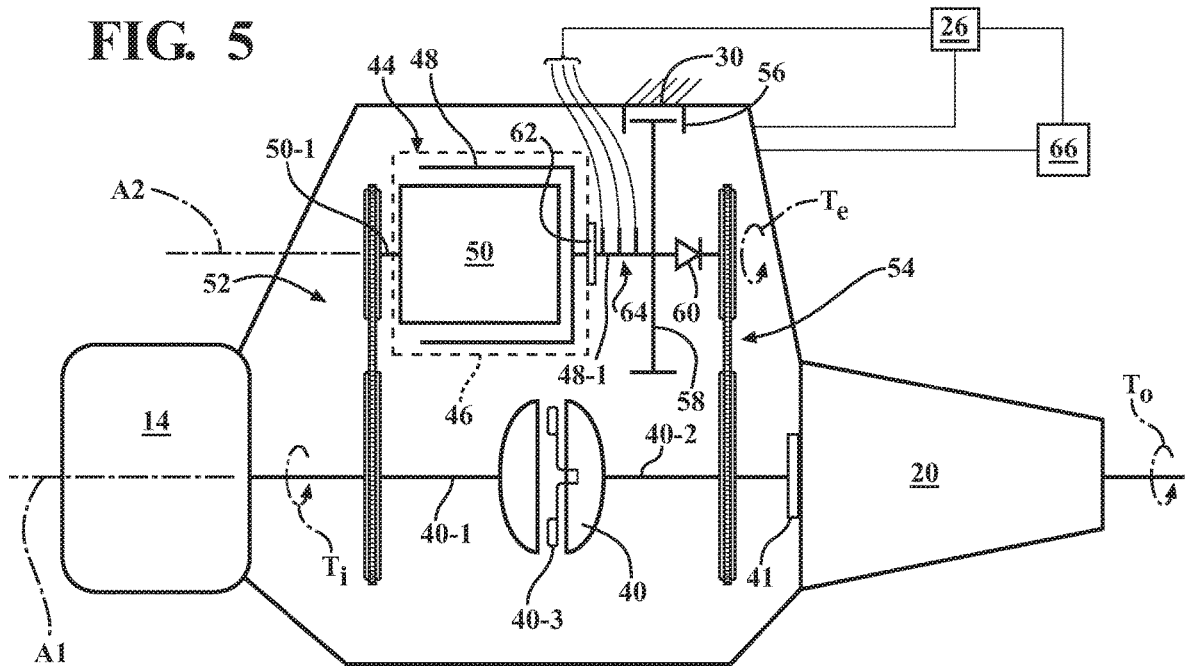

MOTOR VEHICLE HYBRID POWERTRAIN

INTRODUCTION

The present disclosure relates to a multiple power-source hybrid powertrain for a motor vehicle.

Modern motor vehicles frequently employ a powertrain that includes a power-source, such as an internal combustion engine, a multiple speed-ratio transmission, and a differential or final drive. Such a multiple speed-ratio transmission may provide automatic selection of discrete speed ratios and employ either planetary or parallel gearing, or be configured as a continuously variable transmission (CVT).

To produce a more motor efficient vehicle, hybrid vehicle powertrains combine an electric motor and an internal combustion engine. Torque from the engine and the electric motor is typically channeled to the vehicle's driven wheels via the multiple speed-ratio transmission. Efficiency of a hybrid vehicle powertrain is generally related to the percentage of time that the engine must be run in addition to or in place of the electric motor for powering the vehicle.

Some hybrid powertrains employ a single electric motor in combination with the engine. In such powertrains, transmission output, as well as vehicle speed, is directly related to the speeds and torques of the engine and the electric motor. Other hybrid powertrains employ multiple electric motors in combination with the engine to power the vehicle. Such electric motor(s) may be mounted inside the multiple speed-ratio transmission, or be arranged external to the transmission to apply the respective motor torque either upstream of the input or downstream of the output of the transmission.

SUMMARY

A vehicle powertrain includes a first power-source configured to generate a first power-source torque and a multiple speed-ratio transmission configured to transmit the power-source torque to power the vehicle. The powertrain also includes a fluid coupling having a fluid pump shaft operatively connected to the first power-source and a turbine shaft operatively connected to the multiple speed-ratio transmission. The fluid coupling is configured to multiply the first power-source torque, and transfer the multiplied first power-source torque to the multiple speed-ratio transmission. The powertrain additionally includes a second power-source configured to generate a second power-source torque and a first torque transfer system configured to connect the second power-source to the first power-source. The powertrain further includes a second torque transfer system configured to connect the second power-source to the multiple speed-ratio transmission.

Each of the first torque transfer system and the second torque transfer system may be a gear-set or a chain mechanism.

The multiple speed-ratio transmission may include an input shaft. Each of the first power-source, the fluid coupling, and the input shaft of the multiple speed-ratio transmission may be arranged on a first rotational axis. The second power-source may be arranged on a second rotational axis, and the second rotational axis may be arranged parallel to first rotational axis.

The first power-source may be an internal combustion engine. The second power-source may be an electric motor housed inside a motor housing. The electric motor may include a rotor free to rotate relative to the motor housing and including a rotor shaft operatively connected to the first torque transfer system. The electric motor may also include a stator having a stator shaft operatively connected to the second torque transfer system.

The multiple speed-ratio transmission may include a transmission case configured to mount the multiple speed-ratio transmission to the first power-source. The vehicle powertrain may also include a first torque-transmitting device configured to selectively couple the stator to the transmission case.

The stator shaft may include a disc element extending radially therefrom. The first torque-transmitting device may be configured to selectively couple the disc element to the transmission case.

The vehicle powertrain may additionally include a second torque-transmitting device configured to selectively connect the stator shaft to the second torque transfer system.

The second torque-transmitting device may be a multiple-plate friction clutch or a one-way clutch.

The vehicle may include an energy storage device configured to generate and store electrical power for the first and second power-sources.

The vehicle powertrain may further include a rectifier configured to convert alternating current (AC) to direct current (DC) and slip rings configured transfer electrical current to and from the stator. Each of the stator and the rectifier, rotating or stationary, may be housed inside the motor housing, and the slip rings may transfer the DC current to the energy storage device.

The rectifier may be arranged externally to the motor housing, and the slip rings may transfer the AC current to the rectifier for charging the energy storage device.

The slip rings may be arranged along the second rotational axis, either between the disc element and the second torque-transmitting device or between the disc element and the stator.

A motor vehicle employing such a powertrain is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

BRIEF DESCRIPTION OF THE DRAWINGS

FIG. 4 is a schematic stick diagram of one embodiment of the powertrain shown in FIGS. 1-3.

FIG. 5 is a schematic stick diagram of another embodiment of the powertrain shown in FIGS. 1-3.

DETAILED DESCRIPTION

Figure 1:
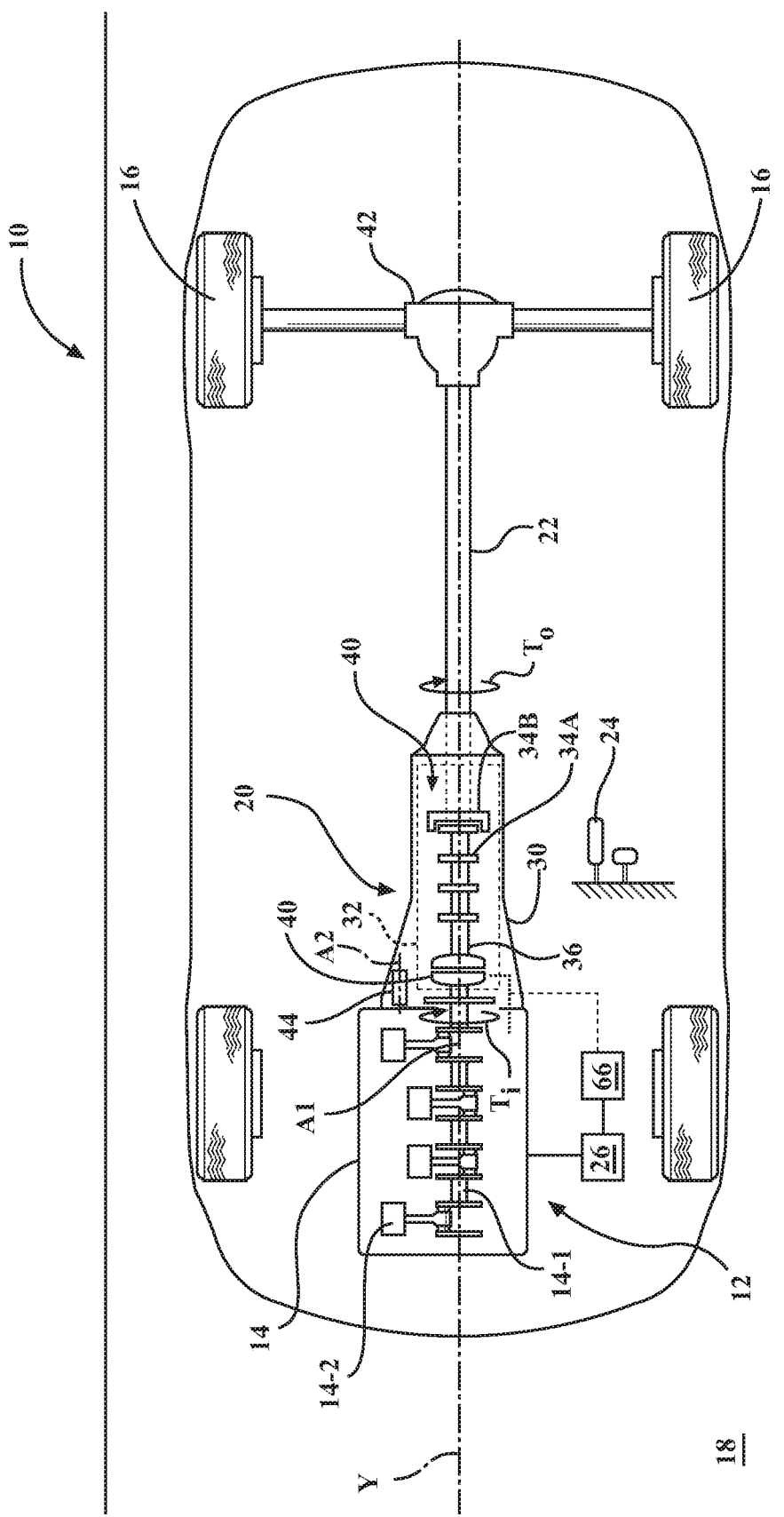
FIG. 1 is a schematic illustration of a motor vehicle employing a longitudinal powertrain that includes an internal combustion engine and an electric motor connected in parallel with a fluid coupling to a multiple speed-ratio transmission, according to the disclosure.
Figure 2:
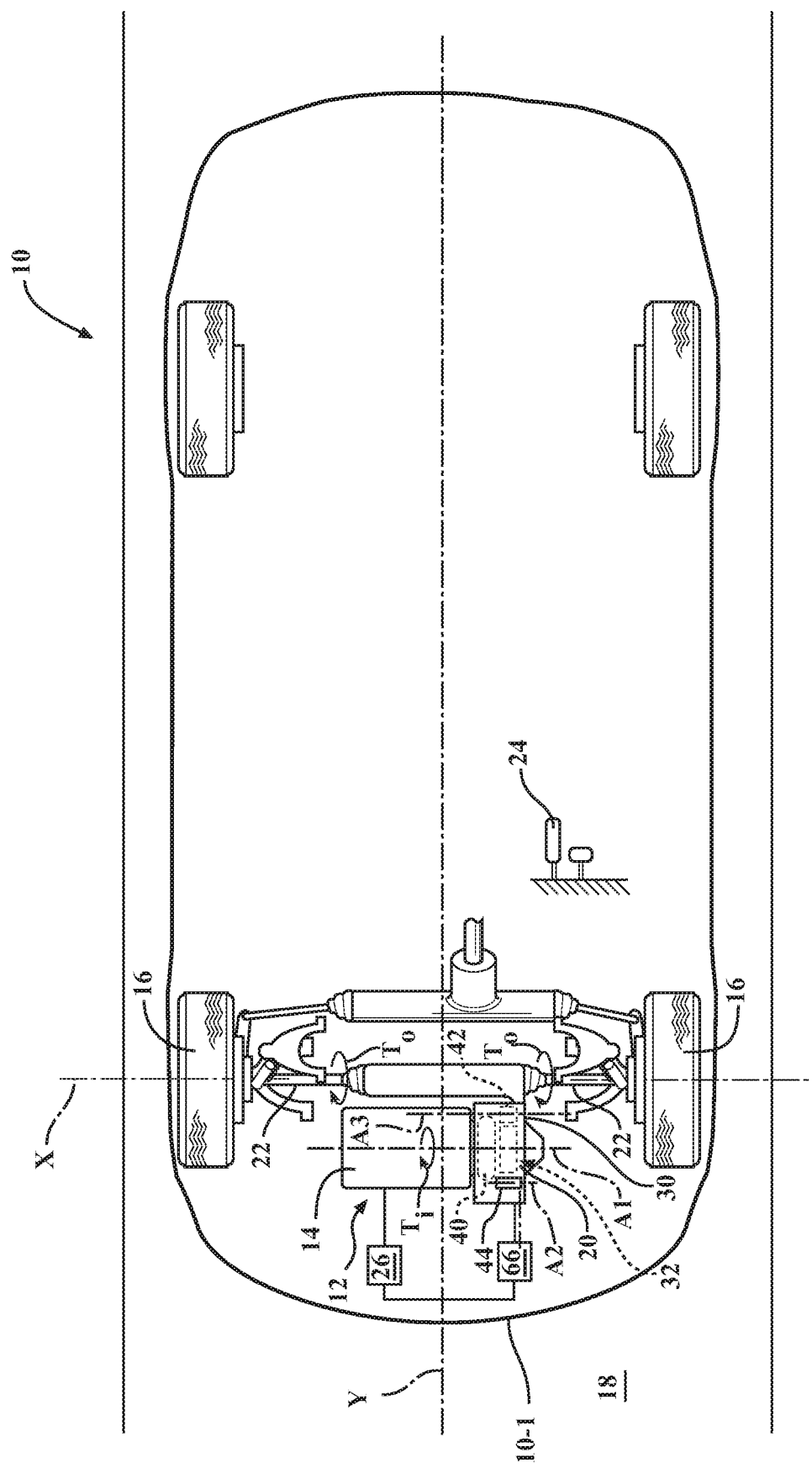
FIG. 2 is a schematic illustration of a motor vehicle employing a transverse powertrain that includes an internal combustion engine and an electric motor connected in parallel with a fluid coupling to a multiple speed-ratio transmission, according to the disclosure.
Figure 3:
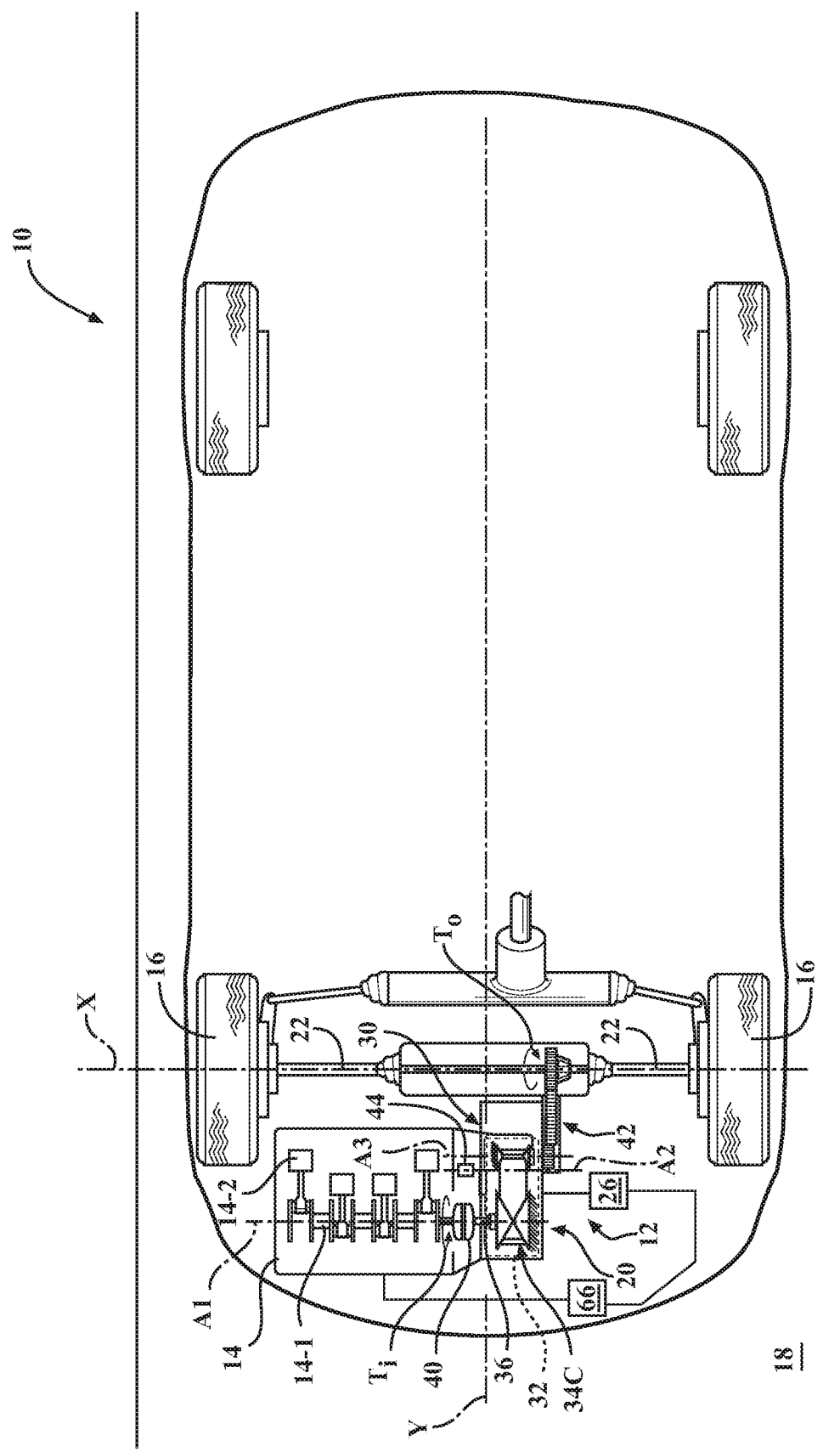
FIG. 3 is a schematic illustration of an embodiment of the motor vehicle employing a transverse powertrain shown in FIG. 2, wherein the multiple speed-ratio transmission is a continuously variable transmission (CVT), according to the disclosure.

Referring to FIGS. 1-3, a motor vehicle 10 having a powertrain 12 is depicted. The vehicle 10 may include, but not be limited to, a commercial vehicle, industrial vehicle, passenger vehicle, aircraft, watercraft, train or the like. It is also contemplated that the vehicle 10 may be a mobile platform, such as an airplane, all-terrain vehicle (ATV), boat, personal movement apparatus, robot and the like to accomplish the purposes of this disclosure.

The powertrain 12 includes a first power-source 14 configured to generate a first power-source torque $T_i$ (shown in FIGS. 1-5) for propulsion of the vehicle 10 via driven wheels 16 relative to a road surface 18. The powertrain 12 also includes a multiple speed-ratio transmission 20, which may be an automatically-shiftable, a.k.a., automatic, transmission. The powertrain 12 may be mounted transversely in the vehicle 10 along a general axis X, i.e., at approximately 90 degrees relative to a longitudinal axis Y of the vehicle, wherein the transmission 20 is configured as a transaxle—a transmission combined with a differential or final-drive assembly. Such a transverse mounting of the powertrain 12 is frequently employed for packaging purposes in front-wheel-drive (FWD) vehicles, where the driven road wheel(s) 16 are arranged proximate a front end 10-1 of the vehicle 10. Alternatively, the powertrain 12 may be mounted longitudinally in the vehicle 10, along the axis Y. Such a longitudinal mounting of the powertrain 12 is frequently employed in rear-wheel-drive (RWD) or four-wheel-drive (4WD) vehicles.

In some vehicle configurations, the powertrain 12 may be mounted longitudinally in the vehicle 10, i.e., substantially aligned with the longitudinal axis X of the vehicle. In other vehicle configurations, the powertrain 12 may be mounted transversely in the vehicle 10, i.e., at approximately 90 degrees relative to the longitudinal axis X of the vehicle. Such a transverse mounting of the powertrain 12 is frequently employed for packaging purposes in front-wheel-drive (FWD) vehicles, where the drive wheel(s) 16 are arranged proximate a front end of the vehicle 10. In such vehicle configurations, the transmission 20 may be combined with a final drive assembly and is generally described as a transaxle. Although the longitudinal transmission embodiment of the transmission 20 is specifically referred to below, the disclosure is also applicable to transaxle configurations of the transmission 20.

The transmission 20 is operatively connected to the first power-source 14, i.e., externally mounted to the first power-source and configured to transfer the first power-source torque $T_i$ to the driven wheels 16. The transmission 20 is further configured to receive and then selectively multiply, reduce, or leave unmodified the first power-source torque $T_i$ to achieve a resultant transmission output torque $T_o$ (shown in FIGS. 1-5) for driving the vehicle 10. As shown in FIGS. 1-3, the driven wheels 16 may be operatively connected to the transmission 20, such as via drive- or half-shaft(s) 22, and configured to receive the transmission output torque $T_o$. A vehicle accelerator 24, such as a pedal or a lever, is provided for the vehicle operator to control the first power-source torque $T_i$ for driving the vehicle 10.

The first power-source 14 may be an internal combustion engine, a fuel-cell, and/or an electric motor (not shown) mounted in the vehicle 10 and having the transmission 20 mounted externally thereto. However, for conciseness and clarity, the present disclosure will concentrate on the internal combustion engine embodiment of the first power-source 14. Accordingly, although the numeral 14 should be seen as generally attributable to such embodiments of the envisioned powertrain, for the remainder of the present disclosure, the numeral 14 will be used to denote the specific embodiment of the powertrain having solely the internal combustion engine. As such, the first power-source torque $T_i$ will be hereinafter also referenced as engine 14 torque. As shown, the particular engine 14 may include a crankshaft 14-1 arranged on the first rotational axis A1 for converting reciprocal motion of its pistons 14-2 into rotational motion and generating the engine 14 torque. The vehicle 10 also includes an energy storage device 26, such as one or more batteries, configured to supply electrical power to the powertrain 12, and specifically the first power-source 14 and various electronically controlled components of the transmission 20.

As shown in FIGS. 1-5, the transmission 20 includes a transmission housing or case 30 for retaining components of the transmission's torque path 32 and mounting the transmission to the first power-source 14. The transmission's torque path 32 provides torque transfer within the transmission to enable selection of the previously noted multiple speed-ratios and for operatively connecting the engine crankshaft 14-1 to the drive wheels 16. The transmission's torque path 32 is configured to receive the first power-source torque $T_i$ and select an input-to-output speed ratio of the transmission 20. Accordingly, the transmission's torque path 32 generally includes components configured to receive and/or transmit the engine 14 torque within the transmission 20, as well as operatively interconnected and arranged along a torque path centerline or one of the axes thereof. As shown in FIG. 1, the torque path 32 may include a gear-train 34A. The gear-train 34A includes a number of gear elements, such as one or more planetary or epicyclic gear-sets (shown in FIG. 1), configured to provide a predetermined number of selectable speed ratios.

The transmission's torque path 32 may also include one or more torque transmitting devices 34B, such as clutches and brakes, retained by the transmission housing 30. The torque transmitting devices 34B are generally cooperatively configured to select transmission speed-ratios and facilitate generation of a predetermined amount of transmission output torque $T_o$. A transmission speed-ratio is generally defined as the transmission input speed divided by the transmission output speed. Shifting from one speed-ratio to another is typically performed in response to a position of the vehicle accelerator 24 and assessed vehicle road speed. Shifting between speed-ratios generally involves releasing one or more "off-going" torque transmitting devices 34B associated with the current speed ratio, and applying one or more "on-coming" torque transmitting devices 34B associated with the desired speed-ratio.

Alternatively, the transmission 20 may be configured as a continuously variable speed ratio transmission (CVT), wherein the transmission's torque path 32 may include a variable diameter pulley system 34C (shown in FIG. 3), configured to provide a continuously variable speed ratio. In general, a continuously variable transmission (CVT), such as the CVT embodiment of the transmission 20, is configured to change through an infinite number of effective gear ratios between a maximum speed ratio and a minimum speed ratio. A typical CVT includes two adjustable pulleys, each having two sheaves. A belt or another suitable endless rotatable device, such as a continuous loop cable or chain, typically runs between the two pulleys, with the two sheaves of each of the pulleys sandwiching the belt therebetween. Frictional engagement between the sheaves of each pulley and the belt couples the belt to each of the pulleys to transfer a torque from one pulley to the other. One of the pulleys may function as a drive pulley so that the other pulley may be driven by the drive pulley via the belt. The speed ratio of the CVT is the ratio of the torque of the drive pulley to the torque of the driven pulley. The speed ratio may be changed by moving the two sheaves of one of the pulleys closer together and the two sheaves of the other pulley farther apart, causing the belt to ride higher or lower on the respective pulley.

In each of the embodiments shown in FIGS. 1-3, the transmission 20 is configured to provide a predetermined number of selectable speed ratios or a continuously variable speed ratio, respectively, and for operatively connecting the first power-source or engine 14 and to transmit the output torque $T_o$ to the drive wheels 16. The transmission 20 also includes an input member 36, such as an input shaft, configured to receive the engine 14 first power-source torque $T_i$ and transfer the subject torque via the transmission's torque path 32. As also shown in FIGS. 1-3, the input member 36 is arranged on and configured to rotate about the first axis A1. The transmission 20 also includes an output member 38, such as an output shaft. The output member 38 is operatively connected to the transmission's torque path 32 and is configured to rotate about the first axis A1 (shown in FIG. 1) or about a third axis A3 that is arranged in parallel with the first axis A1 (shown in FIGS. 2 and 3). During operation of the powertrain 12, the output member 38 is configured to output and pass on the resultant transmission output torque $T_o$.

As shown in each of FIGS. 1-3, the transmission input member 36 is selectively connectable to the engine 14 through a fluid coupling 40, such as a torque converter. Generally, a torque converter uses a transmission fluid supplied by a fluid pump 41. Such a torque converter typically includes an impeller, a turbine, and a stator, with the impeller being interposed between the stator and the turbine. The stator alters the drive's characteristics of the torque converter during periods of high converter slippage, producing an increased first power-source torque $T_i$ or a multiplication in converter output torque. The fluid coupling 40 may be housed within the transmission case 30 and arranged on the first rotational axis A1. The fluid coupling 40 has a pump shaft 40-1 connected to and configured to drive the impeller. The pump shaft 40-1 is operatively connected to the first power-source 14 and configured to receive the first power-source torque $T_i$ therefrom. The fluid coupling 40 additionally includes a turbine shaft 40-2 operatively connected to the transmission 20 at the input member 36, i.e., the transmission input shaft and configured to transfer the converter output torque to the transmission 20. The fluid coupling 40 may also include a torque converter clutch 40-3. Application of the torque converter clutch 40-3 is actuated via pressurized fluid supplied by the pump 41 and configured to lock the turbine to the impeller. Locking the turbine to the impeller causes all torque transmitted through the torque converter 40 to be mechanical, thus eliminating losses associated with fluid drive.

As shown in FIGS. 1-3, the motor vehicle 10 also includes a differential or final-drive assembly 42 configured to transmit the transmission output torque $T_o$ for driving an external load, such as the driven road wheels 16. With continued reference to FIGS. 1-3, the transmission 20 additionally includes a second power-source 44 arranged in parallel with the fluid coupling 40, operatively connected to each of the first power-source 14 and the transmission 20, and configured to generate a second power-source torque. Specifically, as shown in FIGS. 4-5, the second power-source 44 may be an electric motor configured to apply an electric motor torque $T_e$ to the driven road wheels 16 via the transmission 20. As shown, the electric motor 44 is configured to apply the electric motor torque $T_e$ in parallel with the first power-source torque $T_i$ flowing through the fluid coupling 38. The energy storage device 26 may be additionally configured to supply electrical power to the second power-source 44.

The engine 14 and the electric motor 44 may be operatively connected to the transmission torque path 32 at the input member 36. Accordingly, the transmission 20 is configured to receive the first power-source torque $T_i$ and the electric motor torque $T_e$ and output a sum of the first power-source and the electric motor torques to drive a load, e.g., the driven road wheels 16. As shown, the electric motor 44 is arranged on and configured to operate with respect to a second rotational axis A2 that is parallel to the first axis A1. As shown in FIGS. 4-5, the electric motor 44 includes a motor housing 46 and a stator 48, which is free to rotate relative to the motor housing. As shown, the stator 48 is fixed to a stator shaft 48-1. The motor housing 46 is rotationally fixed relative to the transmission housing 30, and may also be mounted directly thereto. The electric motor 44 also includes a rotor 50 fixed to a rotor shaft 50-1 and configured to rotate about the second axis A2.

The powertrain 12 also includes a first torque transfer system 52 configured to connect the second power-source 44 to the fluid coupling 40. The first torque transfer system 52 is specifically configured to transfer the second power-source torque $T_e$ from the rotor 50 to the fluid pump shaft 40-1, and thus add the second power-source torque $T_e$ to the first power-source torque $T_i$. The first torque transfer system 52 and the second torque transfer system may be configured as a gear-set (shown in FIG. 4) or a chain mechanism (shown in FIG. 5). The powertrain 12 additionally includes a second torque transfer system 54 configured to connect the second power-source 44 to the turbine shaft 40-2. Similar to the first torque transfer system 52, the second torque transfer system 54 may be configured as a gear-set (shown in FIG. 4) or a chain mechanism (shown in FIG. 5). The second torque transfer system 54 is configured to transfer the second power-source torque $T_e$, and/or the first power-source torque $T_i$ via the stator 48 to the transmission 20, thereby contributing to the torque of the fluid coupling 40 or in bypass thereof. The rotor shaft 50-1 of the electric motor 44 may be either operatively or directly connected to the first transfer gear-set 52. The stator shaft 48-1 is operatively connected to the second transfer gear-set 54.

The powertrain 12 may additionally include a first torque-transmitting device 56. The first torque-transmitting device 56 may be configured as a friction brake to selectively couple the stator 48, i.e., engage to or disengage from, the transmission case 30. The stator shaft 48-1 may include a disc element 58 extending radially therefrom. The first torque-transmitting device 56 may then be configured to selectively couple the disc element 58 to the transmission case 30. The powertrain 12 may further include a second torque-transmitting device 60. The second torque-transmitting device 60 may be configured to selectively connect the stator shaft 48-1 to the second gear-set 54. The second torque-transmitting device 60 may be configured as a multiple-plate friction clutch (shown in FIG. 4) or a mechanical one-way clutch (shown in FIG. 5). The stator 48 may be operatively connected to a rectifier 62 configured to convert alternating current (AC), which periodically reverses direction, to direct current (DC), which flows in only one direction. The rectifier 62 may be configured to rotate relative to the motor housing 46 and be housed together with the stator 48 inside the motor housing, as shown in FIG. 4, or be stationary relative to the motor housing, as shown in FIG. 5.

The powertrain 12 may also include slip rings 64 configured to transfer electrical power to and from the stator 48. In other words, the slip rings 64 may exchange power between the rectifier 62 and the energy storage device 26, or between the stator 26 and the rectifier. In an embodiment where the rectifier 62 is arranged inside the motor housing 46, such as on the stator shaft 48-1, the slip rings 64 may extract DC current from the stator 48 to the energy storage device 26. Alternatively, in an embodiment where the rectifier 62 is grounded to or arranged external to the transmission housing 30, the stator 48, the slip rings 64 may transfer AC current to such an external rectifier, which may in turn convert the AC current to DC current and then charge the energy storage device 26. Alternatively, such a uni-directional rectifier 62, which converts AC current to DC current, may be replaced by a bi-directional device, e.g., an inverter (not shown) which may transfer electrical energy from the energy storage device 26 to the second power-source 44, for motoring action. As shown in FIG. 4, the slip rings 62 may be arranged along the second rotational axis A2 between the disc element 58 and the second torque-transmitting device 60. Alternatively, as shown in FIG. 5, the slip rings 62 may be arranged along the second rotational axis A2 between the disc element 58 and the stator 48.

Overall, the powertrain 12 is configured to generate electrical energy, i.e., the second power-source torque $T_e$, across the fluid coupling 40, while reducing losses through the fluid coupling. The powertrain 12 may employ an engine 14 with cylinder deactivation or similar technology, where in a certain fraction of engine's cylinders is deactivated based on engine load. In such a powertrain 12, the slip of the torque converter 40 is normally configured to account for the change in engine torsional vibrations due to a varied number of firing cylinders. Because the second power-source 44 provides a bypass for the torque through torque converter 40, the robustness of slip control in the torque converter 40 may be enhanced by assistance from the second power source 44. For example, the amount of torque transferred through torque converter 40 may be reduced, as compared to a powertrain architecture without the second power source 44. As a result, the force required to provide specific engagement of the torque converter clutch 40-3 sufficient to maintain a certain amount of slip inside the torque converter 40, may also be reduced. The second power-source 44 may also be employed to provide the vehicle 10 with hybrid propulsion. The second power-source 44 may be additionally employed to facilitate control of the slip in the torque converter 40 during cylinder deactivation modes of the subject engine 14 during speed-ratio shifts in the transmission 20 via the gear-train 34A and the torque transmitting devices 34B.

The powertrain 12 may operate in stop-start mode when either the first torque-transmitting device 56 or the second torque-transmitting device 60 is engaged. Specifically, in such a stop-start mode, the electric motor 44 may be employed as an alternator-starter for the engine 14. When the torque converter clutch 40-3 is open or slipping at low differential speed and the second torque-transmitting device 60 is engaged, the electric motor 44 may be employed as a generator across the fluid coupling 40, reduce losses across the fluid coupling, and provide a bypass for the second power-source torque $T_e$ to the transmission's torque path 32, i.e., effectively circumventing the fluid coupling.

When the torque converter clutch 40-3 is open, slipping at low differential speed, or locked, and the first torque-transmitting device 56 is engaged, the powertrain 12 may operate in generator mode, wherein at least some of the first power-source torque $T_i$ is used to drive the electric motor 44. Additionally, when the torque converter clutch 40-3 is open and the first torque-transmitting device 56 is engaged, the second power-source torque $T_e$ may be used to crank the engine 14 in the stop-start mode. Furthermore, when the torque converter clutch 40-3 is open, the powertrain 12 may operate in one of two motoring modes. For example, when the first torque-transmitting device 56 is engaged and the second torque-transmitting device 60 is disengaged, the electric motor 44 may be used to assist the engine 14 in powering the vehicle 10.

The powertrain 12 may be controlled by a programmable electronic controller 66 configured to achieve desired propulsion of the vehicle 10 in response to command(s) from an operator of the subject vehicle. Specifically, the controller 66 may be programmed to control the first power-source 14, select transmission 20 speed ratios, regulate operation of the first and second torque-transmitting devices 56, 60, and activate the second power-source 44 to generate a predetermined amount of transmission output torque $T_o$. The controller 66 may include a central processing unit (CPU) that regulates various functions on the vehicle 10, or be configured as a powertrain control module (PCM) configured to control the entire powertrain 12, or a dedicated transmission control unit (TCU) for controlling solely the transmission 20. Configured as either a CPU or a PCM for the powertrain 12, the controller 66 may be employed to control and coordinate operation of the first power-source 14, the second first power-source 44, and the transmission 20. In either of the above configurations, the controller 66 includes a processor and tangible, non-transitory memory, which includes instructions for operation of the powertrain 12 programmed therein. The memory may be an appropriate recordable medium that participates in providing computer-readable data or process instructions. Such a recordable medium may take many forms, including but not limited to non-volatile media and volatile media.

Non-volatile media for the controller 66 may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to a processor of a computer. Memory of the controller 66 may also include a flexible disk, hard disk, magnetic tape, another magnetic medium, a CD-ROM, DVD, another optical medium, etc. The controller 66 may be configured or equipped with other required computer hardware, such as a high-speed clock, requisite Analog-to-Digital (A/D) and/or Digital-to-Analog (D/A) circuitry, input/output circuitry and devices (I/O), as well as appropriate signal conditioning and/or buffer circuitry. Algorithms required by the controller 66 or accessible thereby may be stored in the memory and automatically executed to provide the required functionality of the powertrain 12.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A powertrain for powering a vehicle, the powertrain comprising:
   a first power-source configured to generate a first power-source torque;
   a multiple speed-ratio transmission having an input shaft and configured to transmit the first power-source torque to power the vehicle;
   a fluid coupling having a fluid pump shaft operatively connected to the first power-source and a turbine shaft operatively connected to the multiple speed-ratio transmission, multiply the first power-source torque, and transfer the multiplied first power-source torque to the multiple speed-ratio transmission;
   a second power-source configured to generate a second power-source torque;
   a first, torque transfer system configured to connect the second power-source to the first power-source; and
   a second torque transfer system configured to connect the second power-source to the multiple speed-ratio transmission;
   wherein:
      each of the first power-source, the fluid coupling, and the input shaft is arranged on a first rotational axis;
      the second power-source is arranged on a second rotational axis; and
      the second rotational axis is arranged parallel to first rotational axis.

2. The powertrain according to claim 1, wherein each of the first torque transfer system and the second torque transfer system is a gear-set or a chain mechanism.

3. The powertrain according to claim 1, wherein the first power-source is an internal combustion engine, and wherein the second power-source is an electric motor housed inside a motor housing, the electric motor including:
   a rotor free to rotate relative to the motor housing and having a rotor shaft operatively connected to the first torque transfer system; and
   a stator having a stator shaft operatively connected to the second torque transfer system.

4. The powertrain according to claim 3, wherein the multiple speed-ratio transmission includes a transmission case configured to mount the multiple speed-ratio transmission to the first power-source, the powertrain further comprising a first torque-transmitting device configured to selectively couple the stator to the transmission case.

5. The powertrain according to claim 4, wherein the stator shaft includes a disc element extending radially therefrom, and wherein the first torque-transmitting device is configured to selectively couple the disc element to the transmission case.

6. The powertrain according to claim 4, further comprising a second torque-transmitting device configured to selectively connect the stator shaft to the second torque transfer system.

7. The powertrain according to claim 6, wherein the second torque-transmitting device is a multiple-plate friction clutch or a one-way clutch.

8. The powertrain according to claim 6, wherein the vehicle includes an energy storage device configured to generate and store electrical power for the first and second power-sources, the powertrain further comprising a rectifier configured to convert alternating current (AC) to direct current (DC) and slip rings configured transfer electrical current to and from the stator.

9. The powertrain according to claim 8, wherein:
   each of the stator and the rectifier is housed inside the motor housing, and the slip rings transfer the DC current to the energy storage device; or
   the rectifier is arranged externally to the motor housing, and the slip rings transfer the AC current to the rectifier for charging the energy storage device.

10. A motor vehicle comprising:
    a vehicle powertrain including:
       a first power-source configured to generate a first power-source torque;
       a multiple speed-ratio transmission having an input shaft and an output member and configured to transmit the first power-source torque to power the motor vehicle;
       a fluid coupling having a fluid pump shaft operatively connected to the first power-source and a turbine shaft operatively connected to the multiple speed-ratio transmission, multiply the first power-source torque, and transfer the multiplied first power-source torque to the multiple speed-ratio transmission;
       a second power-source configured to generate a second power-source torque;
       an energy storage device configured to generate and store electrical power for the first and second power-sources;
       a first torque transfer system configured to connect the second power-source to the first power-source; and
       a second torque transfer system configured to connect the second power-source to the multiple speed-ratio transmission; and
    a road wheel operatively connected to the output member to receive the first power-source torque and/or the second power-source torque transmitted by the multiple speed-ratio transmission;
    wherein:
       each of the first power-source, the fluid coupling and the input shaft is arranged on a first rotational axis;
       the second power-source is arranged on a second rotational axis; and
       the second rotational axis is arranged parallel to first rotational axis.

11. The motor vehicle according to claim 10, wherein each of the first torque transfer system and the second torque transfer system is a gear-set or a chain mechanism.

12. The motor vehicle according to claim 10, wherein the first power-source is an internal combustion engine, and wherein the second power-source is an electric motor housed inside a motor housing, the electric motor including:
    a rotor free to rotate relative to the motor housing and having a rotor shaft operatively connected to the first torque transfer system; and
    a stator having a stator shaft operatively connected to the second torque transfer system.

13. The motor vehicle according to claim 12, wherein the multiple speed-ratio transmission includes a transmission case configured to mount the multiple speed-ratio transmission to the first power-source, wherein the vehicle powertrain additionally includes a first torque-transmitting device configured to selectively couple the stator to the transmission case.

14. The motor vehicle according to claim 13, wherein the stator shaft includes a disc element extending radially therefrom, and wherein the first torque-transmitting device is configured to selectively couple the disc element to the transmission case.

15. The motor vehicle according to claim 13, wherein the vehicle powertrain additionally includes a second torque-transmitting device configured to selectively connect the stator shaft to the second torque transfer system.

16. The motor vehicle according to claim 15, wherein the second torque-transmitting device is a multiple-plate friction clutch or a one-way clutch.

17. The motor vehicle according to claim 15, further comprising a rectifier configured to convert alternating current (AC) to direct current (DC) and slip rings configured transfer electrical current to and from the stator.

18. The motor vehicle according to claim 17, wherein:
each of the stator and the rectifier is housed inside the motor housing, and wherein the slip rings transfer the DC current to the energy storage device; or
the rectifier is arranged externally to the motor housing, and the slip rings transfer the AC current to the rectifier for charging the energy storage device.

* * * * *